United States Patent [19]

Wright

[11] Patent Number: 5,577,824
[45] Date of Patent: Nov. 26, 1996

[54] TRAFFIC CONE-MOUNTED WARNING LIGHTS

[75] Inventor: Barry T. Wright, Merseyside, Great Britain

[73] Assignee: Molex Incorporated, Lisle, Ill.

[21] Appl. No.: 400,246

[22] Filed: Mar. 8, 1995

[30] Foreign Application Priority Data

Mar. 9, 1994 [GB] United Kingdom ............ 9404601

[51] Int. Cl.⁶ .................................................. B60Q 7/00
[52] U.S. Cl. .................. 340/908.1; 340/908; 340/473; 362/191; 116/63 C
[58] Field of Search ............................. 340/908.1, 908, 340/471, 473; 362/191, 396, 184, 802; 116/63 C, 63 P

[56] References Cited

U.S. PATENT DOCUMENTS

| | | | |
|---|---|---|---|
| 5,294,924 | 3/1994 | Dydzyk | 340/471 |
| 5,453,729 | 9/1995 | Chu | 362/183 |
| 5,469,342 | 11/1995 | Chien | 362/189 |

FOREIGN PATENT DOCUMENTS

| | | |
|---|---|---|
| 1503574 | 3/1978 | United Kingdom . |
| 2039354 | 8/1980 | United Kingdom . |
| 2144532 | 3/1985 | United Kingdom . |
| 2199400 | 7/1988 | United Kingdom . |

Primary Examiner—Jeffery Hofsass
Assistant Examiner—Nina Tong
Attorney, Agent, or Firm—Stephen Z. Weiss

[57] ABSTRACT

The invention provides an apparatus for mounting a light-emitting device on a traffic cone, including a head portion for housing the light-emitting device, a power source-receiving portion in connectable or connected electrical contact with the head portion, and a traffic cone-receiving portion. The head portion and the power source-receiving portion are disposed laterally with respect to the traffic cone-receiving portion such that when the apparatus is mounted on a cone and a power source is received in the power source-receiving portion, the head portion and the power source-receiving portion lie laterally alongside the section of the cone received in the cone-receiving portion, and the center of gravity of the apparatus is substantially coincident with the longitudinal axis of the cone.

17 Claims, 8 Drawing Sheets

TRAFFIC CONE-MOUNTED WARNING LIGHTS

FIELD OF THE INVENTION

This invention relates to an improved system, comprising apparatus and method aspects, for mounting one or more warning lights on a traffic cone, such as the cones widely employed on roads and motorways.

BACKGROUND OF THE INVENTION AND PRIOR ART

Traffic cones are used for a variety of traffic control purposes, for example to warn drivers of the presence of roadworks, and to direct the flow of traffic along preferred lines. To carry out their functions properly, the cones must be clearly visible even at night and under adverse weather conditions, and to this end they are frequently provided with one or more light reflecting surfaces, which reflect light from the headlamps of oncoming vehicles. When reflection of light is insufficient, it is common to position a warning light on the traffic cone, the warning light comprising a battery housing and a head projecting upwardly therefrom. The head contains a lamp powered by a battery in the battery housing and a lens for controlling the direction in which light from the lamp is transmitted as a substantially unidirectional beam in a single or in two opposite, parallel directions.

It is evident, considering the profusion of traffic cones on motorways, that only the simplest systems for mounting the housing on the traffic cone are practicable. In one such known mounting system, the battery housing is mounted on a circular bracket which may be positioned as a collar around the conical neck of a traffic cone. Thus, in use with the collar located on the neck of the traffic cone, the battery housing and head of the warning light are presented at one side of the cone.

This known mounting system has been employed on roads worldwide, but it suffers from a number of disadvantages. One is its mechanical instability: the weight of the warning light, when fitted with a battery, is normally comparable with that of the traffic cone on the side of which the warning light is supported. Thus, the warning light tends to destabilize the traffic cone. Furthermore, the exposed head of the warning light is liable to be caught by high winds. The possible consequences of the cone or warning light being knocked over are all too obvious: the warning light may be damaged as it hits the ground; the disappearance of the traffic light will result in hazardous areas being insufficiently marked out; and above all, the cone and warning light may fall into the path of traffic, thus creating a new, highly significant traffic hazard.

Roadworkers who fit warning lights onto traffic cones have noticed the instability of this known mounting system, and as a result frequently attempt to make the head of the warning light less exposed by fitting the warning light upside down on the traffic cone, that is with the head projecting downwardly beneath the battery housing. This makes the warning light less visible and misdirects the beam from the optimum direction for maximum effectiveness. Furthermore, many designs of warning light are such that when positioned upside down in this way, they have a disadvantageous tendency to collect rainwater within the head.

Another feature of the known warning light described above is that the battery is generally retained inside the battery housing by a mechanism in which screwthreaded elements are used either to connect the battery directly to the housing, or to hold together elements which enclose the battery. These screw-threaded elements must be laboriously removed and repositioned whenever a battery is renewed. So as to prevent theft of the battery, the screw-threaded elements are usually locked in position such that a key is needed to remove them. This is despite the fact that in many environments, for example motorways, the theft of batteries from warning lights would be uncommon even if their battery housings were not locked.

GB-A-2039354, GB-A-2144532 and GB-A-2199400 discloses various alternative constructions and arrangements of hazard warning lights for mounting on traffic cones. In all of these proposals, the lamp unit is mounted generally vertically above the apex of the cone. However, such arrangements share similar instability problems to the commercially known example discussed above, particularly as regards their top-heaviness.

A further alternative construction of warning light for mounting on a traffic cone is disclosed in GB-A-1503874. In this arrangement the lamp head is still mounted vertically above the apex of the cone, but dual battery compartments are arranged laterally on either side thereof. Whilst this improves the top-heaviness of the combined arrangement somewhat, it still does not optimise the physical stability of the cone-mounted unit, especially against high winds, and furthermore the disclosed construction is applicable only to dual battery-powered lamps, which frequently may not be desirable or practical.

SUMMARY OF THE INVENTION

The present invention seeks to alleviate or solve at least some of the aforementioned problems and to this end provides a system, including method and apparatus aspects, which permits, among other things, the quick, easy, versatile and stable mounting of one or more light-emitting devices on a traffic cone without substantially destabilizing the traffic cone to the same extent as the known mounting systems described above.

Accordingly, in a first aspect, the invention provides an apparatus for mounting at least one light-emitting device on a traffic cone, comprising:

at least one head portion for housing the at least one or a respective light-emitting device;

at least one power source-receiving portion in connectable or connected electrical contact with the head portion or portions; and a traffic cone-receiving portion;

wherein the at least one head portion and the at least one power source-receiving portion are disposed laterally with respect to the traffic cone-receiving portion such that upon reception of a traffic cone in the cone-receiving portion, the at least one head portion and the at least one power source-receiving portion lie laterally alongside the section of the cone received in the cone-receiving portion, and when a or a respective power source is received in the or respective power source-receiving portion or portions and the apparatus is mounted on a traffic cone, the center of gravity of the apparatus is substantially coincident with or proximate to the longitudinal axis of the cone.

In a most preferred form of the apparatus of the invention, the apparatus comprises a single head portion for housing preferably a single light-emitting device, a power source-receiving portion in connectable or connected electrical contact with the said head portion, and a traffic cone-receiving portion located therebetween.

In other forms of the invention, the apparatus comprises a plurality of power source-receiving portions, each for receiving a respective power source, which are disposed equiangularly around a central cone-receiving portion of the apparatus, with the one or more head portions for housing the light-emitting device or devices also being disposed around the central cone-receiving portion in a manner such that the complete apparatus is balanced with its center of gravity substantially coincident with or proximate to the longitudinal axis of the cone.

A primary advantage of mounting light-emitting devices on traffic cones by use of the invention is the improved mechanical stability which results. For example, in the case of the most preferred form of apparatus of the invention (as defined above) when the apparatus is in position on a traffic cone and contains a power source (which may be a battery weighing several hundred grams) within the power source-receiving portion, the said power source and the head portion of the warning light lie opposite each other with respect to the longitudinal axis of the traffic cone and to either side of the central, cone-receiving section of the apparatus, and their weights therefore tend to balance one another with the center of gravity of the apparatus lying proximate to and preferably substantially coincident with, the longitudinal axis of the cone and below the apex of the cone. This most preferred embodiment is particularly advantageous, as optimum mechanical stability is achieved while using only a single power source.

In other embodiments, where plural power sourcereceiving portions are provided, the symmetrical disposition thereof around the cone-receiving portion provides a symmetrically balanced arrangement in a similar manner.

Furthermore, under high wind conditions, a traffic cone carrying the apparatus of the invention is potentially less likely to be destabilized or knocked over than the same traffic cone carrying a warning light comprising any of the known prior art mounting systems described above. This improved stability in high winds can be attributed principally to the optimally lowered and centralized positioning of the center of gravity of the apparatus, as compared with the various known proposals already referred to.

In the various embodiments of the invention, the traffic cone-receiving portion is preferably formed with one or more substantially circular apertures through which the tip of a traffic cone can be passed, the or each aperture being of such a diameter that the warning light can be positioned at a preferred height location on the cone. The cone-receiving portion may additionally, or even alternatively, be formed with one or more surfaces shaped such that they can rest snugly covering a or a respective area on the surface of the traffic cone. Preferably, the traffic cone-receiving portion includes a generally frustoconical passage for accommodating a corresponding frustoconical section of the traffic cone. Other shapes of traffic cone are of course possible and the shape and/or construction of the cone-receiving portion of the apparatus of the invention may be selected accordingly.

The or each power source-receiving portion of the apparatus is preferably constructed and arranged for readily receiving one or more batteries which constitute the power source, electrical contacts being suitably located within the or each power source-receiving portion to communicate electrically with the contacts of the or each battery.

The battery or batteries may be retained inside the or each housing by a retaining mechanism, for example one resembling the retaining mechanism of the known warning lights described above. In more preferred forms, the or each power source-receiving portion comprises one or more cavities opening towards the traffic cone receiving portion, so that the or each battery can be inserted into the or a respective cavity and subsequently, when the warning light is in position on the traffic cone, held in place and retained within its cavity by the traffic cone itself. This has the advantage that in use, one or more exhausted batteries can be renewed when necessary simply by lifting the warning light off the traffic cone, exchanging the or each exhausted battery for a fresh one and repositioning the warning light on the traffic cone.

Most preferably, the or each power source receiving portion comprises a cavity having an opening, preferably an opening adjacent the traffic cone receiving portion, through which the battery can be inserted into the power source receiving portion via the cone-receiving portion, and a closure flap capable of substantially closing the opening so as to secure the battery within the power source receiving portion. Preferably, the closure flap is retained in the closed position without the need for additional retaining elements, e.g. screw thread elements, by virtue of a detent or clip arrangement or any other similarly acting means. This arrangement allows an exhausted battery to be easily replaced, whilst ensuring that a battery under use is securely retained within the battery receiving portion, even when the apparatus is not mounted on a traffic cone.

The light-emitting device or devices for use with the mounting apparatus of the invention, or as components of the warning light of the invention, are preferably lamps of any desired kind, e.g. xenon lamps, as are already known in the art. One or more of the light-emitting devices may alternatively, for example, be a light-emitting diode, or an array of such diodes. Sockets are preferably provided within the head portion(s) for receiving the light-emitting device(s).

The or each head portion is preferably formed such that a lens for directing the light produced by the light-emitting device(s) is integral therewith or may be attached thereto. The lens and the head portion preferably cooperate so as to direct the light in a substantially single direction, usually perpendicularly away from the longitudinal axis of the traffic cone. In some embodiments, the head portion is provided with a shroud flange projecting generally parallel to or substantially parallel to the central axis of the lens and which surrounds the periphery of the lens, the shroud flange serving to protect the lens against damage, for example if the warning light receives a glancing blow from a passing vehicle.

The traffic cone-receiving portion, the head portion(s) and the battery-receiving portion(s) of the apparatus are all preferably formed integrally in a single moulding operation, e.g. moulded of plastics material, examples of which are well known in the art and already used in conventional traffic warning lamps and other road furniture. In some practical embodiments, the mounting apparatus or warning light of the invention may be formed to additionally comprise a handle to facilitate its mounting on a traffic cone and transportation from one place to another.

Control circuitry is preferably provided, positioned for example on a circuit board in the or each head portion, for controlling the operation of the light-emitting devices. The control circuitry may comprise traffic cone-sensing means, to sense whether the apparatus is in position on the traffic cone, the light- emitting devices only being powered if this is the case. The traffic cone-sensing means may, for example, be a spring contactor which is deformed and makes contact with an adjacent connector when the apparatus is positioned on a traffic cone. The traffic cone may, for example, directly contact the spring contactor when the warning light is mounted thereon. However, more preferably, the traffic cone may act no deform the spring contactor via one or more intermediate elements, for example a flexible tongue provided in the head portion. In this way, the spring contactor can be more readily protected from adverse environmental conditions, e.g. excessive heat or cold, moisture, dust or other debris.

The control circuitry may additionally or alternatively be capable of powering the light-emitting devices according to a variety of other criteria, for example to make them flash under control of an oscillator, or to power them in response to a low level of ambient light, as sensed by light sensitive elements provided, for example, on the or each circuit board or head portion or other part of the apparatus.

Preferably, the apparatus of the invention comprises means by which the light emitting device(s) can be manually disabled, which may be desirable for instance when although a warning light is mounted on a cone its operation is not required. This disabling means may suitably be an electrical isolation switch provided in the circuitry providing power to the light emitting device(s).

To avoid the situation where a warning light is inadvertently left switched off, it is particularly desirable that a readily noticeable visual indication of the status of any manually operable disabling means be provided. For example, an indicator or pilot light may be provided, which light is lit when the main lamp(s) of the warning light is disabled. Alternatively or additionally, a visual indicator may be provided, such as by means of the position of the disabling means (e.g. switch) itself or an indicator means attached thereto.

In a particularly preferred embodiment, the apparatus of the invention includes traffic cone sensing means comprising a flexible tongue provided in the head portion, which tongue is deformed when the apparatus is mounted on a cone, this deformation displacing an intermediate element which in turn deforms a spring contactor, whereupon the light emitting element(s) is/are connected to the, or each respective, power source. In much an apparatus, the intermediate element may be constructed and arranged to form the lamp disabling means, by virtue of being manually displaceable into a position in which it is no longer disposed between the flexible tongue and the spring contactor, such that even when the tongue is deformed by a cone, the spring contactor is not deformed and the light emitting device(s) is/are thus disabled.

In a second aspect, the present invention provides a warning light for mounting on a traffic cone, comprising the mounting apparatus of the invention as described above, the said head portion or portions housing one or more light-emitting devices.

In a third aspect, the present invention provides a method of mounting one or more light-emitting devices on a traffic cone, comprising the step of positioning a portion of the traffic cone within the traffic cone-receiving portion of the warning light of the invention.

Preferred embodiments of the invention will now be described in detail with reference to the accompanying drawings.

DETAILED DESCRIPTION OF PREFERRED EMBODIMENTS.

Figure 1:
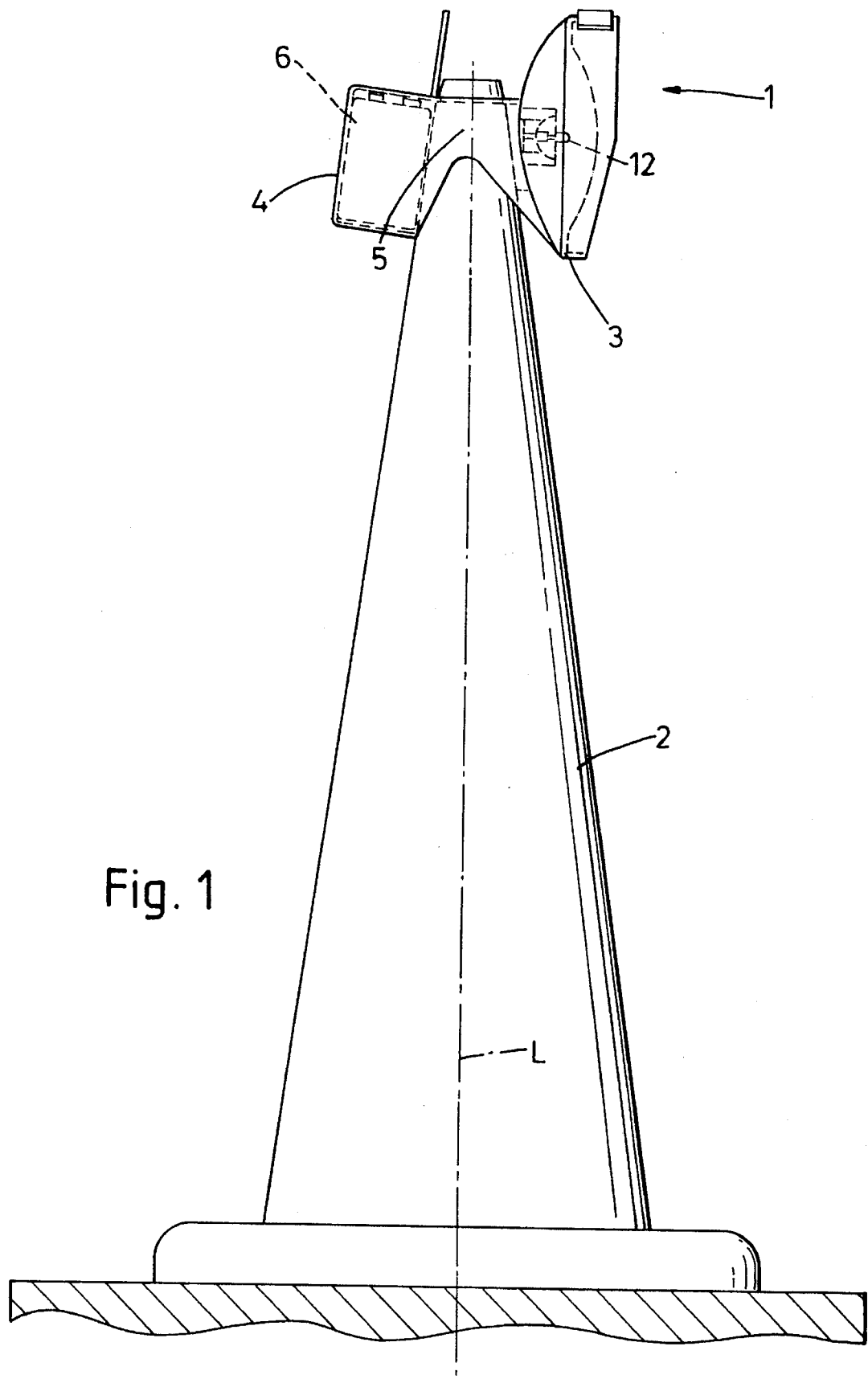
FIG. 1 is a side elsrational view in partial cross-section of a first preferred embodiment of the warning light of the invention shown mounted in position on a traffic cone.

Referring firstly to FIG. 1, a warning light 1 according to the invention is shown in position on a traffic cone 2. A head portion 3 houses a socket portion 12; a battery receiving portion 4 contains a battery 6; and between them is a cone-receiving portion 5.

As will be seen, the battery-receiving portion 4 and the head portion 3 are diametrically disposed with respect to the longitudinal axis L of the cone, so that the weight of the battery 6 and battery receiving portion 4 tends to balance that of the head portion 3, such that the center of gravity of the apparatus is substantially coincident with the cone's longitudinal axis L.

Figure 2:
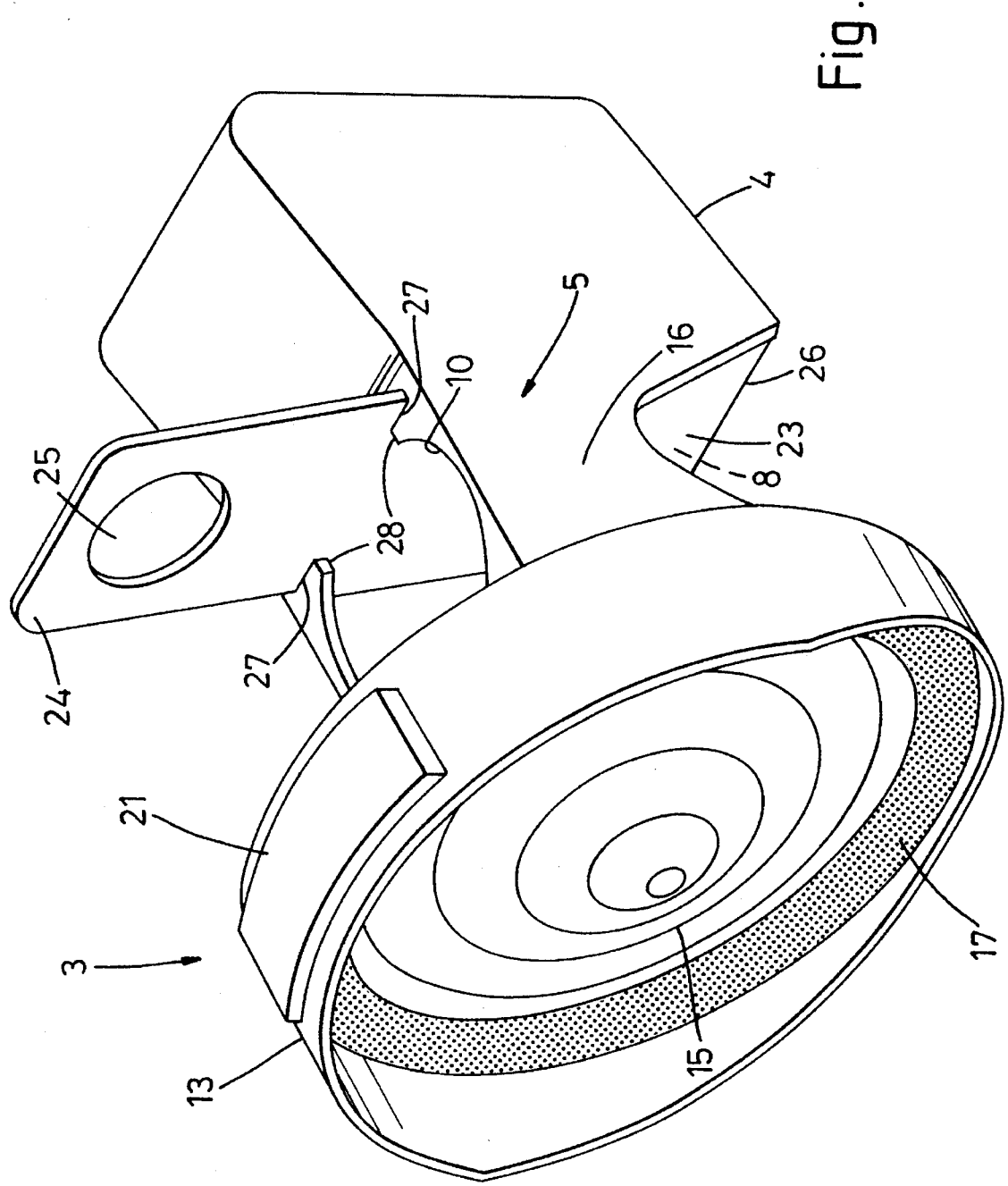
FIG. 2 is a perspective view of the warning light of FIG. 1.

As shown in FIG. 2, the cone-receiving portion 5 comprises a generally circular aperture 10 through which the tip of the traffic cone may be passed, and spaced apart walls 16 which are contoured so as to fit snugly onto respective surface portions of the traffic cone. The head portion 3 comprises a lens 15, a reflective area 17, and a protective shroud flange 13. Upwardly facing solar charging cells 21 may advantageously be incorporated into the apparatus, for example, positioned on the shroud flange 13, for converting ambient light into electrical power which is transmitted to the battery-receiving portion 4 to trickle charge the battery 6.

The battery 6 may be inserted into the battery receiving portion 4 through an opening 8 which is subsequently closed by a hinged or jointed flap 23 so as to secure the battery 6 within the battery receiving portion 4.

Figure 3:
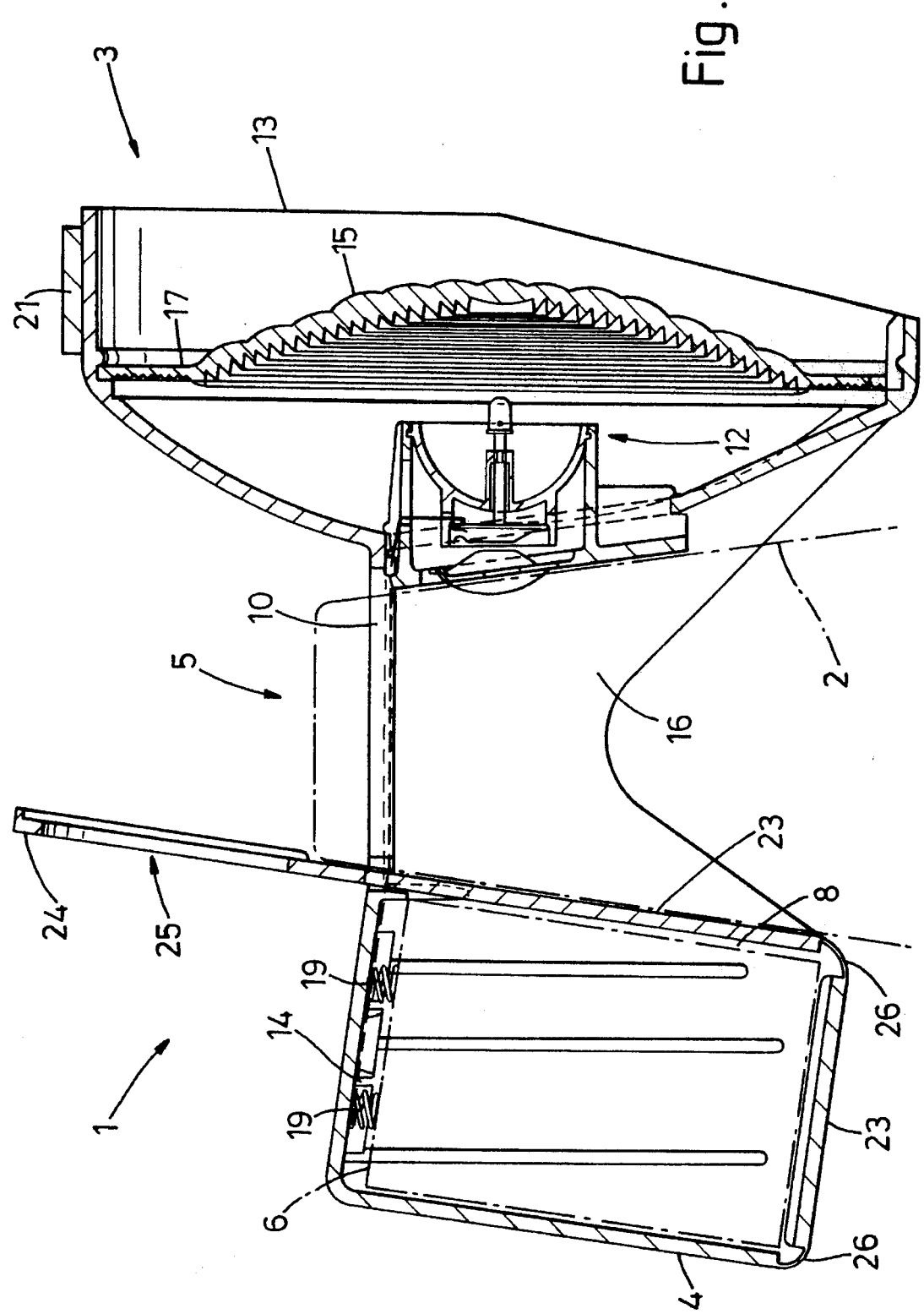
FIG. 3 is an enlarged cross-sectional view of the warning light shown in FIG. 2.

When in the closed position (as shown in FIGS. 2 and 3), an upper portion 24 of the closure flap 23 protrudes through the aperture 10 and is engaged in a recess 28 formed in a section of the perimeter of the aperture 10. Shoulder formations 27 of the closure flap 23 abut the upper surface of the battery receiving portion 4, so as to retain the closure flap 23 in this closed position. Additionally, the mouth of the recess 28 is preferably slightly narrower than the engaged portion of the closure flap 23 to more securely retain it therein, the engaged portion of the closure flap 23 or the material at the mouth of the recess 28, or both, preferably being sufficiently resilient to allow the closure flap 23 to be manually forced into and out of engagement with the recess 28 by a snap-fit action.

To insert a battery 6, the closure flap 23 disengaged from the recess 28 and pulled downwards through the aperture 10, hinge portions 26 of the closure flap 23 and/or the material closure flap 23 itself, deforming to allow this action. To ease this operation, an orifice 25 is provided in the upper portion 24 of the closure flap 23, which orifice 25 is suitable for manual gripping. Conveniently, this orifice 25 may also be used as a handle to carry the warning lamp 1 when the closure flap 23 is in its closed position. Once the closure flap 23 has been opened, a battery 6 is inserted into the battery receiving portion 4 through the opening 8 and the closure flap 23 is returned to the closed position to secure the battery in position in the battery-receiving portion 4.

Also shown in FIG. 3 are the battery contact strips 14 by which electrical power is drawn from the battery via battery contacts 19, the power then being transmitted along the battery connector strips or wires 14 to the socket portion 12.

Figure 4:
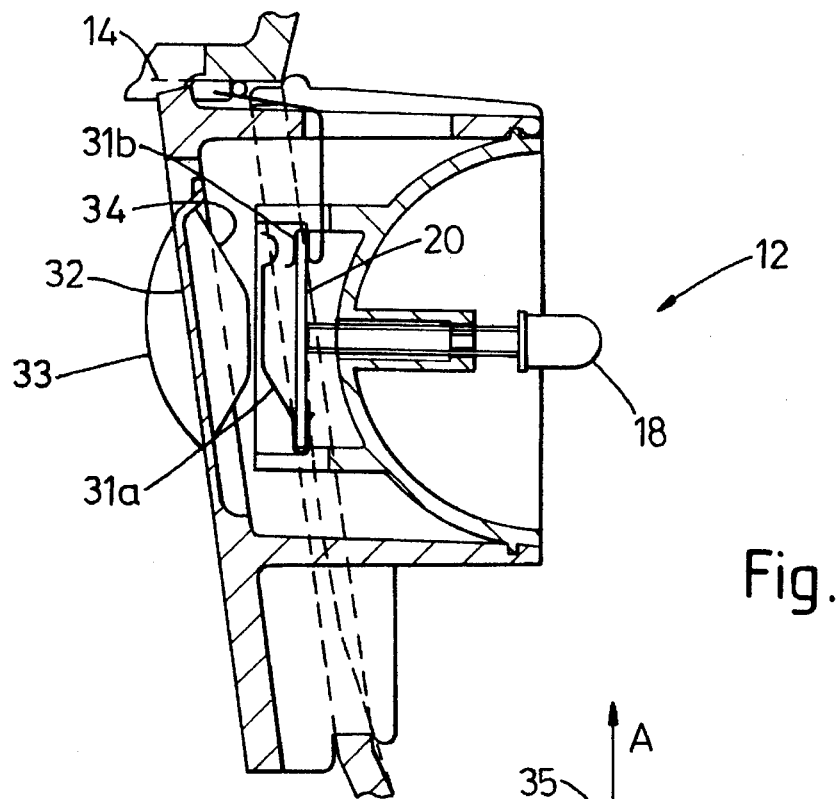
FIG. 4 is an enlarged cross-sectional view of the socket portion of the warning lamp shown in FIG. 2.

FIG. 4 shows in more detail the socket portion 12, which comprises a lamp 18 mounted on a circuit board 20. Control circuitry provided on the circuit board 20 controls the supply to the lamp 18 of power drawn from the battery 6 along battery contact strips or wires 14. A light-sensitive device (not shown) located on the circuit board 20 senses the level of ambient light by measuring the light diffused to the circuit board 20 through the warning light 1. The control circuit reacts to information received from the light sensitive device, and from the spring contactor 31*a* which is deformed so as to make contact with an adjacent connector 31*b* when the warning light 1 is positioned on the traffic cone.

The spring contactor 31*a* is indirectly deformed by the traffic cone 2 as it enters the cone-receiving portion of the unit via an intermediate flexible tongue 32 formed integrally with the socket portion 12. When the warning light 1 is positioned on the cone 2, the cone 2 contacts an outer rib 33 of the tongue 32. This causes the tongue 32 to bend towards the spring contactor 31*a*, an inner rib 34 of the tongue 32 abutting the spring contactor 31*a* and deforming it such that it makes contact with the adjacent connector 31*b*.

Figure 5:
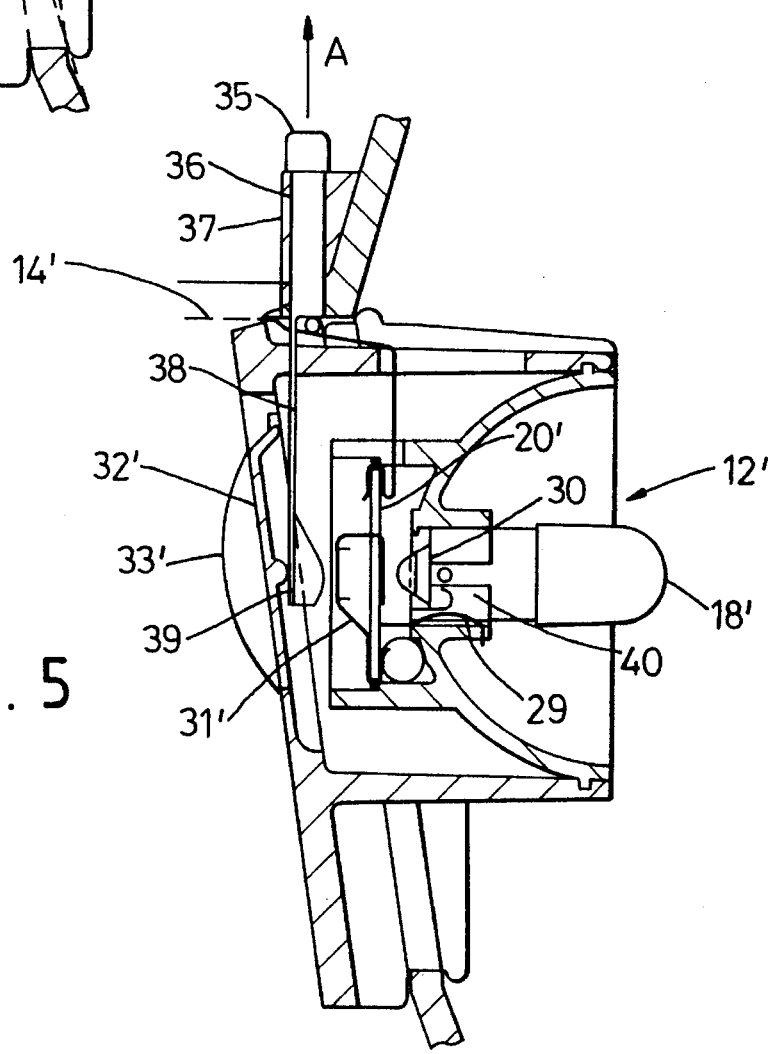
FIG. 5 ie an enlarged cross-sectional view corresponding to that of FIG. 4 of an alternative socket portion.

The socket portion 12' shown in FIG. 5 is similar in construction to that of FIG. 4 and is also suitable for use in the warning light 1 of FIGS. 1 to 3. A lamp 18' is held in a bayonet type fitting 40 (any other suitable attachment means may of course be used, e.g. a screw thread) and is electrically connectable to the control circuitry, which may be the same as that in the socket portion of FIG. 4, provided on a circuit board 20'. One terminal of the lamp 18' is permanently connectable to the control circuitry by a first electrical contact 29 and the other terminal of the lamp 18 is switchably thereto by a second contact 30 which is contacted by spring contactor 31' when the latter is deformed indirectly by a cone, via a flexible tongue 32', an outer ridge 33' of which is contacted by the cone, and a disabling element 38.

The disabling element 38 is supported at its upper end 36 within a boss 37 formed externally on the socket portion 12'. The disabling element 38 can be displaced vertically upwards in the direction of the arrow A and is preferably restrained from rotating, for instance by its upper end 36 having a square or rectangular cross-section for engagement in a corresponding square or rectangular bore in the boss 37. When the disabling element 38 is displaced vertically upwards, preferably by grasping and pulling its protruding end 35, its foot 39, is correspondingly displaced upwardly into a position in which it is no longer disposed between the tongue 32' and the spring contactor 31'. In this way, the lamp be disabled, since the deformation of the tongue 32' when the warning lamp 1 is mounted on a cone is insufficient to cause the spring contactor 31' to deform, in the absence of the disabling element 38 therebetween. The disabled status of the lamp 18' is indicated by the raised position of the protruding top end 35 of the disabling element 38 which can be held in this raised position using any suitable retaining means (not shown), such as a detent element. The lamp 18' can be re-enabled by simply releasing any retaining means and dropping or pushing the disabling element 38 down into its original position (as seen in FIG. 5.

Figure 6:
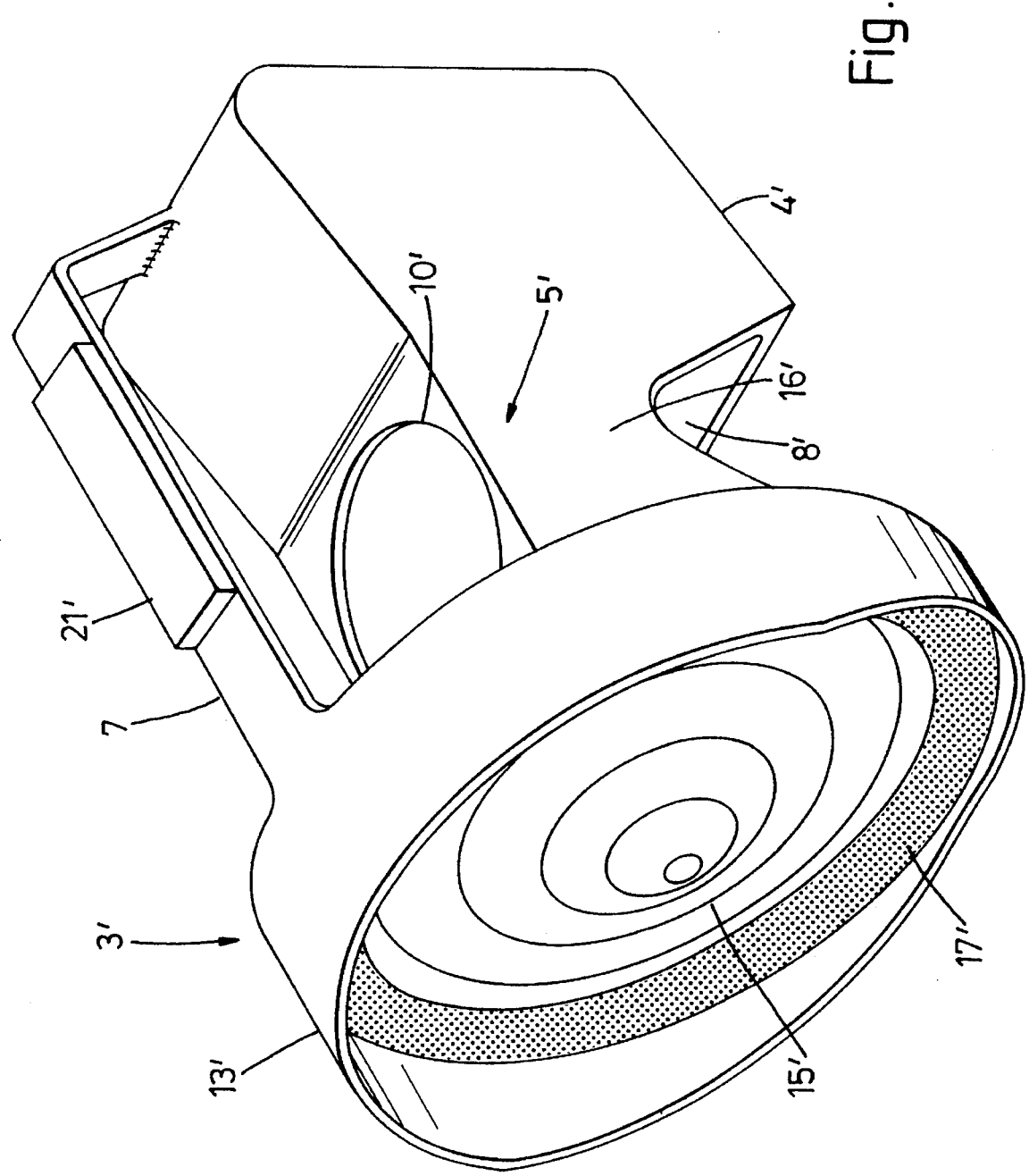
FIG. 6 is a perspective view of a second embodiment of the warning light of the invention.
Figure 7:
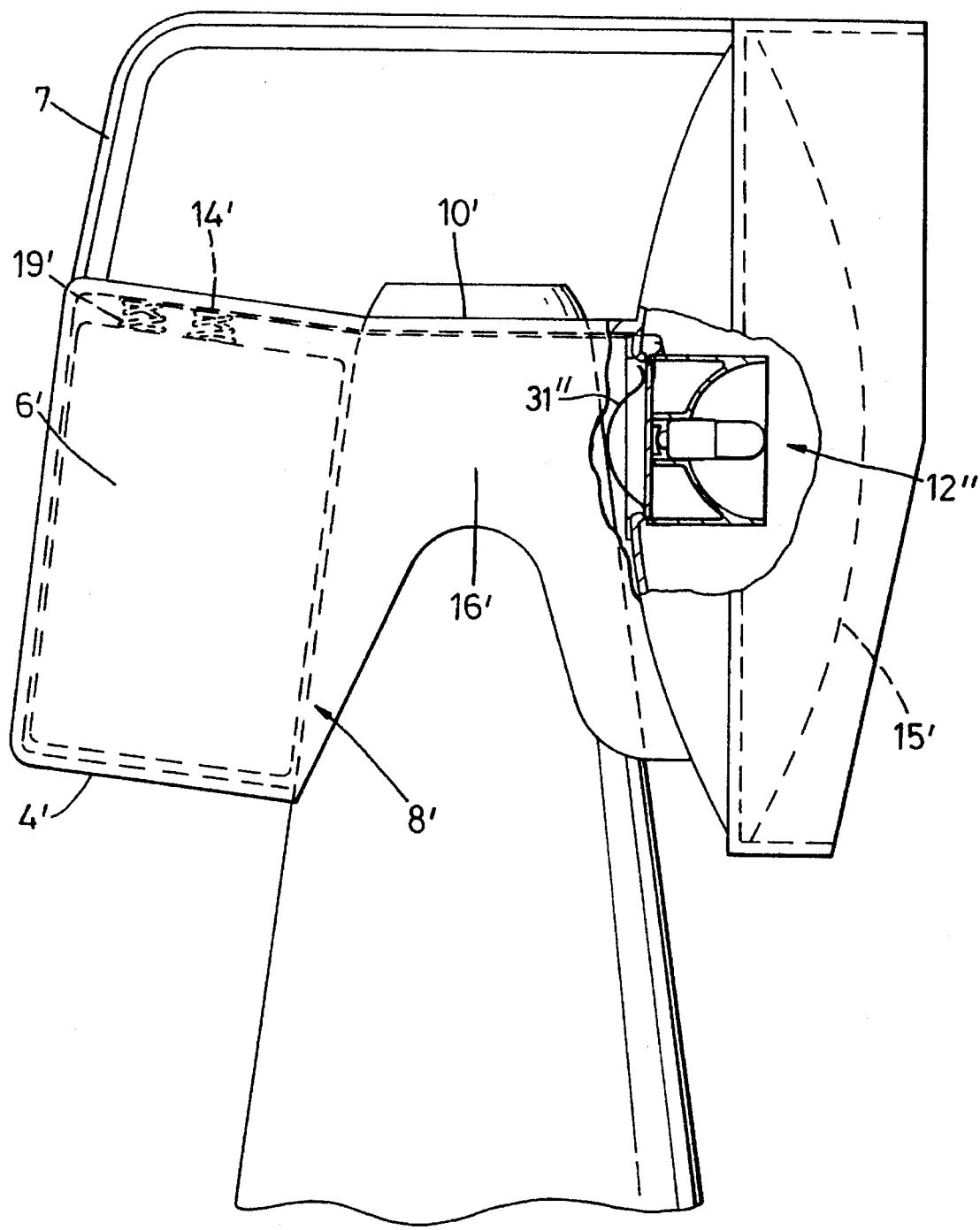
FIG. 7 is a side elevational view in partial cross-section of the warning lamp of FIG. 6, shown mounted in position on the top section of a traffic cone.

FIGS. 6 and 7 show a second warning light according to the invention, very similar in construction to the embodiment described above: a head portion 3' houses a socket portion 12"; a battery receiving portion 4' contains a battery 6'; and between them is a conereceiving portion 5'. A handle 7 facilitates positioning and carrying of the warning light.

The cone-receiving portion 5' comprises a generally circular aperture 10' through which the tip of the traffic cone may be passed, and spaced apart walls 16' which are contoured so as to fit snugly onto respective surface portions of the traffic cone. The head portion 3' comprises a lens 15', a reflective area 17', and a protective shroud flange 13'. Upwardly facing solar charging cells 21' positioned on the handle 7 convert ambient light into electrical power which is transmitted to the battery-receiving portion 4' to trickle charge the battery 6'. The battery 6' may be inserted into the battery-receiving portion 4' through an opening 8' which is blocked so as to trap the battery 6' when the warning light is positioned on the traffic cone.

In this embodiment the spring contactor 31" which acts to detect the presence of a cone onto which the unit is mounted and thereby activate the lamp, is contacted directly by the cone surface, as seen in FIG. 7.

Figure 8:
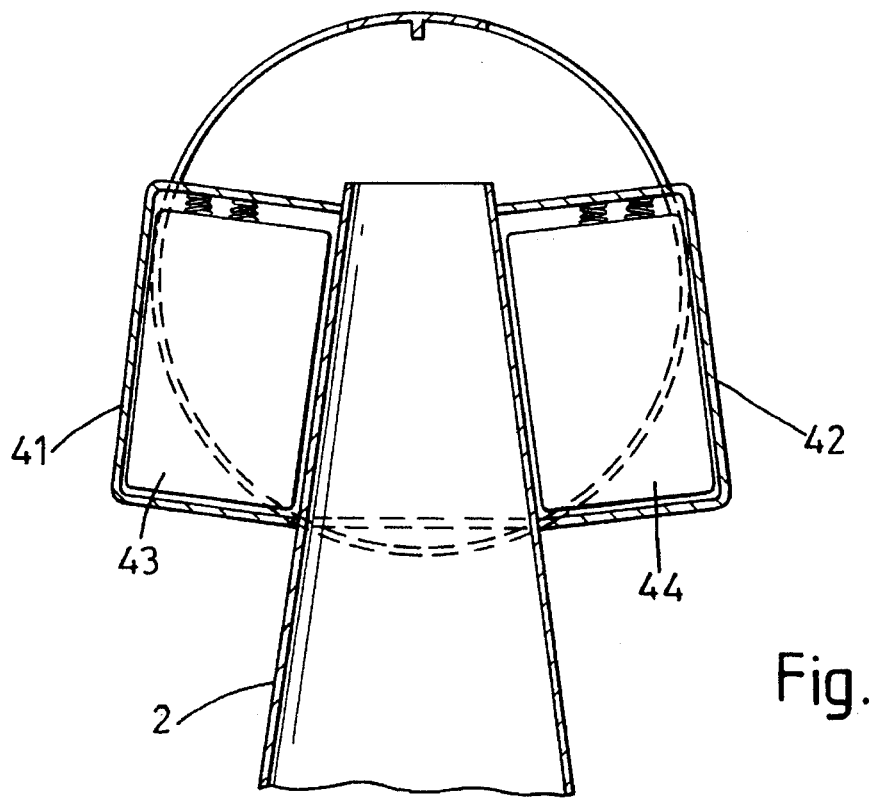
FIG. 8 is a view in partial cross-section of a third embodiment of the warning light of the invention shown positioned on the top section of a traffic cone.
Figure 9:
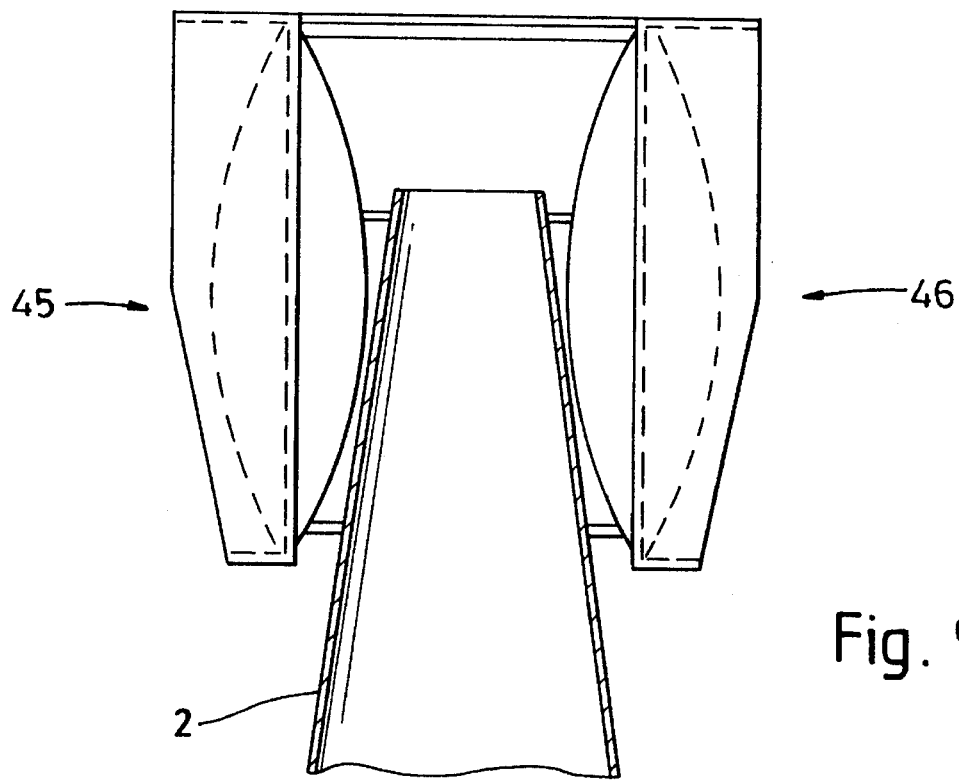
FIG. 9 is a view in partial cross-section from one side of the embodiment of FIG. 8.
Figure 10:
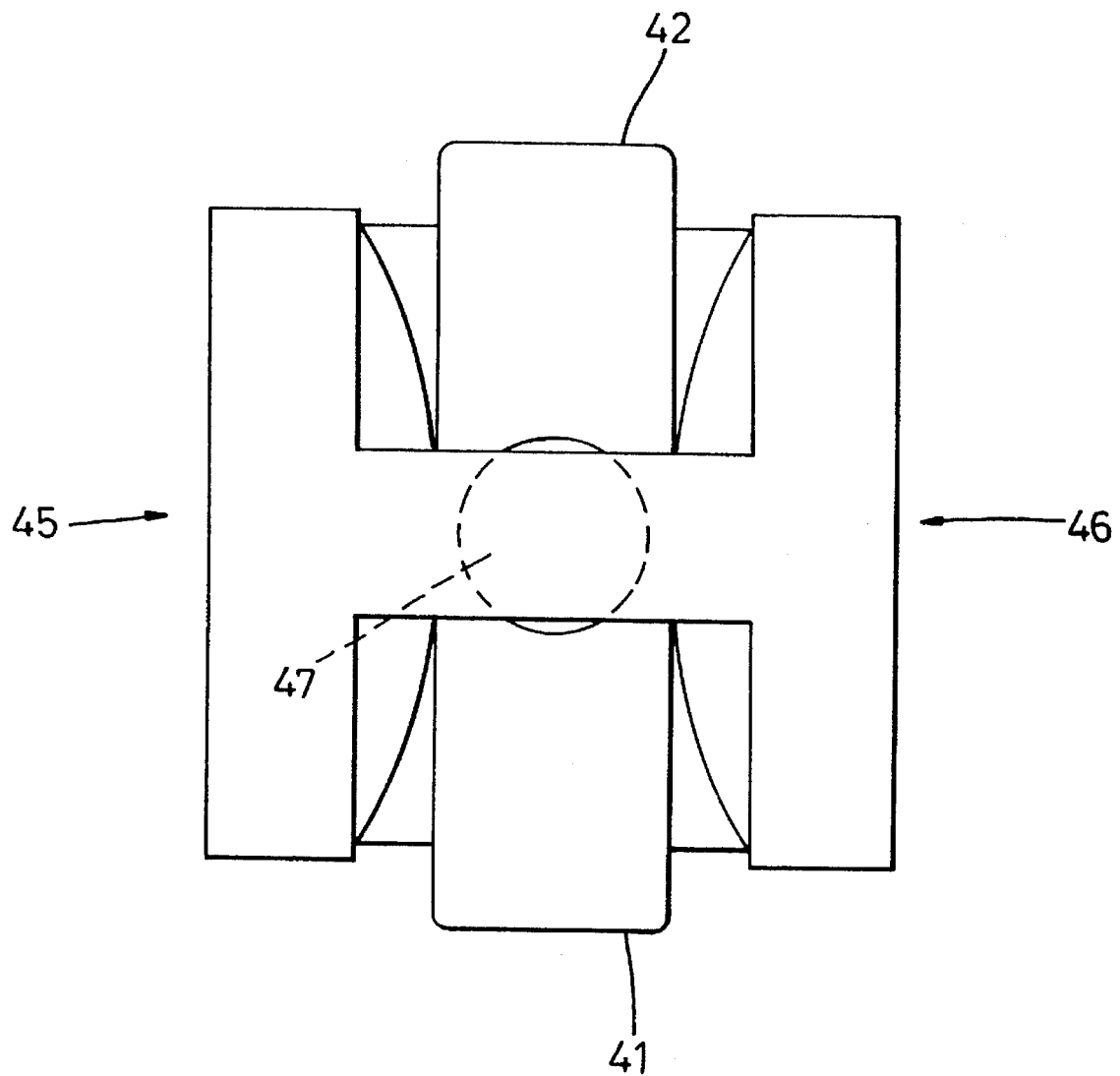
FIG. 10 is a top plan view of the embodiment of FIG. 8.

FIGS. 8, 9 and 10 show a third embodiment of the warning light of the invention, comprising two battery housings 41,42 and two head portions 45,46. The battery housings 41,42, which contain batteries 43,44, are diametrically disposed with respect to an aperture 47 in the warning light which constitutes the cone-receiving portion, and the heads 45,46 are also diametrically disposed with respect to the aperture 47 but at right angles to the diametrical disposition of the batteries, so that the center of gravity of the warning light again lies on the axis of the cone 2.

Preferred embodiments of the warning light of the invention have been described above for purposes of illustration only, and many variations are possible within the scope of the invention as will be clear to persons skilled in the art. Some embodiments, for example, comprise one battery housing and two heads, the heads and the battery housing being disposed in a balanced triangular relationship about the cone-receiving portion so that when the warning light is in position on a cone, the center of gravity of the warning light lies still within the cone proximate its longitudinal axis.

I claim:

1. An apparatus for mounting at least one light-emitting device on a traffic cone, comprising:

at least one head portion for housing said at least one light-emitting device;

at least one power source-receiving portion in connectable or connected electrical contact with said head portion; and a traffic cone-receiving portion;

wherein said at least one head portion and said at least one power source-receiving portion are disposed laterally with respect to the traffic cone-receiving portion such that upon reception of a traffic cone in the cone-receiving portion, said at least one head portion and said at least one power source-receiving portion lie laterally adjacent the section of said cone received in said cone-receiving portion, and when a respective power source is received in a respective power source-receiving portion and the apparatus is mounted on the traffic cone, the center of gravity of the apparatus is substantially proximate to the longitudinal axis of the cone.

2. An apparatus according to claim 1, wherein the apparatus comprises a single head portion for housing a single light-emitting device, a single power source-receiving portion in connectable or connected electrical contact with said single head portion, and said traffic cone-receiving portion located therebetween.

3. An apparatus according to claim 1, wherein the apparatus comprises a plurality of power source-receiving portions for receiving respective one of a plurality of power sources, which are disposed equiangularly around a central cone-receiving portion of the apparatus.

4. An apparatus according to claim 3, wherein the at least one head portion for housing the at least one or the respective light-emitting device are disposed around the central cone-receiving portion in a manner such that the apparatus is balanced with its center of gravity substantially coincident with or proximate to the longitudinal axis of the cone.

5. An apparatus according to claim 1, wherein the traffic cone-receiving portion is formed with at least one substantially circular apertures through which the tip of the traffic cone can be passed, the or each aperture being of such a diameter that the apparatus can be positioned at a desired defined height location on the cone.

6. An apparatus according to claim 1, wherein the traffic cone-receiving portion is formed with at least one surfaces which are shaped such so as to rest snugly covering a respective area on the surface of the traffic cone.

7. An apparatus according to claim 6, wherein the surfaces are constituted by a generally frustoconical passage for accommodating a corresponding frustoconical section of the traffic cone.

8. An apparatus according to claim 1, wherein the power source-receiving portion of the apparatus is constructed and arranged for receiving at least one battery which constitute the power source, electrical contacts being located within the power source-receiving portion to communicate electrically with the contacts of the battery.

9. An apparatus according to claim 8, wherein the power source-receiving portion comprises a cavity having an opening through which the battery can be inserted into the power source-receiving portion via the cone-receiving portion, and a closure flap capable of substantially closing the opening so as to secure the battery within the power source receiving portion.

10. An apparatus according to claim 9, wherein the closure flap and/or the power source-receiving portion are constructed and arranged such that the closure flap is capable of retaining the battery by virtue of a detent or clip arrangement.

11. An apparatus according to claim 8, wherein the power source-receiving portion comprises one or more cavities opening towards the traffic cone receiving portion, so that the battery can be inserted into a respective cavity via the cone-receiving portion and subsequently, when the apparatus is in position on the traffic cone, held in place and retained within its cavity by the traffic cone itself.

12. An apparatus according to claim 1, wherein the or each head portion is formed such that a lens for directing the light produced by the light-emitting device is integral therewith or is attachable thereto, the lens and the head portion cooperating so as to direct the light in a substantially unidirectional beam.

13. An apparatus according to claim 1, wherein the traffic cone-receiving portion, the head portion and the power source-receiving portion of the apparatus are all formed integrally by moulding.

14. An apparatus according to claim 1, which includes control circuitry for controlling the operation of the light-emitting device, the control circuitry comprising traffic cone-sensing means to sense whether the apparatus is in position on the traffic cone, the light-emitting device only being powered if this is the case.

15. An apparatus according to claim 1, which includes means by which the light-emitting device can be manually disabled.

16. An apparatus according to claim 15, which further includes means for providing a visual indication of whether the light-emitting device has been manually disabled.

17. A hazard or warning light for mounting on a traffic cone, comprising the mounting apparatus according to claim 1, said at least one head portion housing said at least one light-emitting device.

* * * * *